United States Patent
Bradbury et al.

(10) Patent No.: US 8,718,483 B2
(45) Date of Patent: May 6, 2014

(54) DEPLOYABLE PHOTONIC LINK AND INTERFACE MODULE

(75) Inventors: Ian Bradbury, Elizabeth Downs (AU); Gregory Steven Pope, Hewett (AU); Graham Howard Zacher, Hectorville (AU)

(73) Assignee: BAE Systems Australia Ltd, Edinburgh (AU)

( * ) Notice: Subject to any disclaimer, the term of this patent is extended or adjusted under 35 U.S.C. 154(b) by 357 days.

(21) Appl. No.: 12/373,882

(22) PCT Filed: Oct. 31, 2008

(86) PCT No.: PCT/AU2008/001627
§ 371 (c)(1),
(2), (4) Date: Nov. 7, 2011

(87) PCT Pub. No.: WO2009/055872
PCT Pub. Date: May 7, 2009

(65) Prior Publication Data
US 2012/0039610 A1 Feb. 16, 2012

(30) Foreign Application Priority Data
Oct. 31, 2007 (AU) .............................. 2007905971

(51) Int. Cl.
*H04B 10/00* (2013.01)
(52) U.S. Cl.
USPC ....................................................... 398/171

(58) Field of Classification Search
USPC ................................... 398/171, 209; 385/135
See application file for complete search history.

(56) References Cited

U.S. PATENT DOCUMENTS

| | | | | |
|---|---|---|---|---|
| 4,651,571 A | * | 3/1987 | McGlade | 73/773 |
| 5,051,754 A | * | 9/1991 | Newberg | 342/375 |
| 6,522,826 B2 | * | 2/2003 | Gregory | 385/135 |
| 7,469,105 B2 | * | 12/2008 | Wake et al. | 398/171 |
| 7,599,386 B2 | * | 10/2009 | Laamanen et al. | 370/463 |
| 8,000,649 B2 | * | 8/2011 | Shiff et al. | 455/11.1 |
| 8,180,225 B2 | * | 5/2012 | Werthen et al. | 398/171 |
| 2007/0058989 A1 | * | 3/2007 | Kaku et al. | 398/209 |
| 2007/0242689 A1 | * | 10/2007 | Zavadsky et al. | 370/464 |

* cited by examiner

*Primary Examiner* — Leslie Pascal
(74) *Attorney, Agent, or Firm* — Maine Cernota & Rardin

(57) ABSTRACT

A deployable photonic link including a deployable length of optical fiber and an interface module fusion spliced to at least one end of the optical fiber so that the module is directly connected to the fiber. The interface module including at least one of: an input for receiving a first electrical signal including a first radio frequency (RF) signal component; and an output for outputting a second RF signal component. The interface module further including, respectively, at least one of: a device for receiving the first electrical signal from the input and for producing an optical signal modulated with the first RF signal component for transmission in the optical fiber; and a device for receiving a modulated optical signal and for producing therefrom the second RF signal component for output at the output. An interface module may also contain both the input and the output and the devices for receiving RF signals and for receiving modulated optical signals.

14 Claims, 4 Drawing Sheets

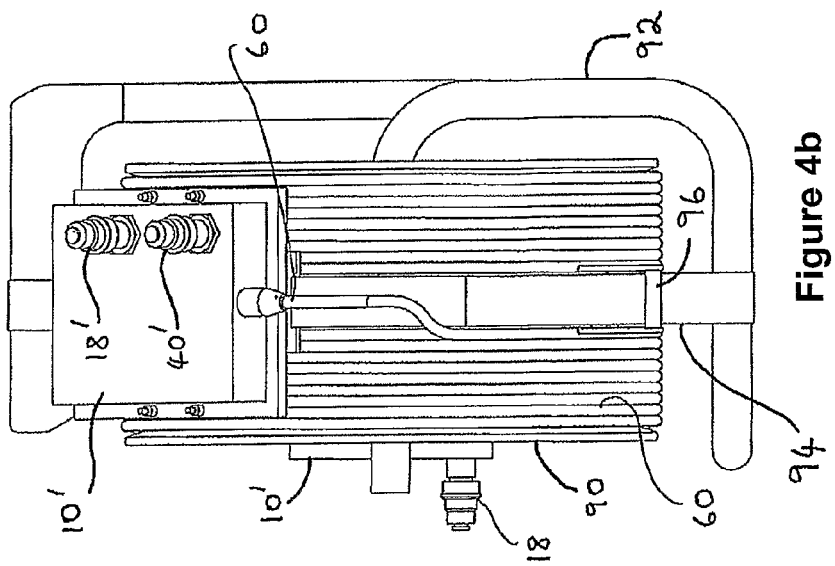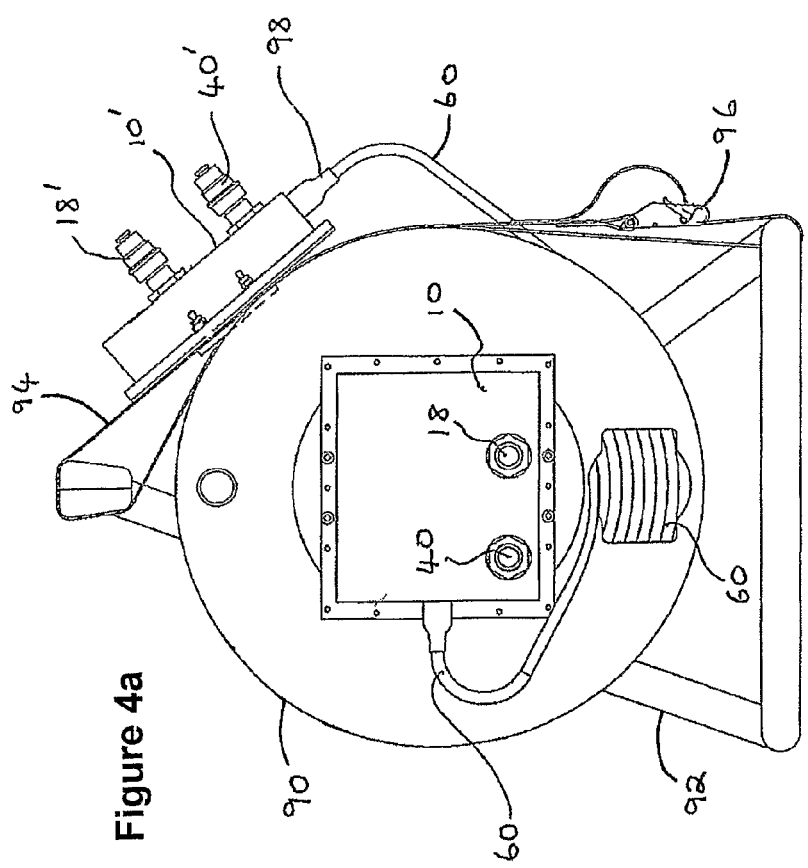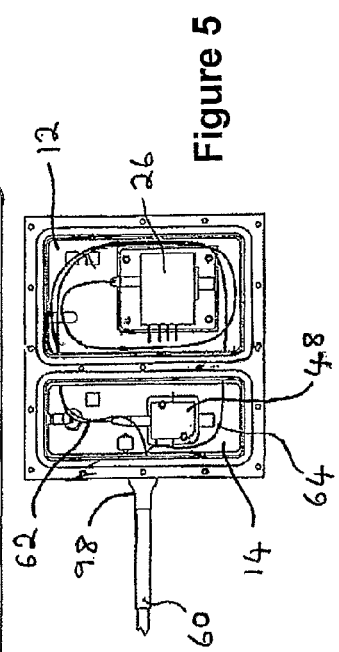

US 8,718,483 B2

DEPLOYABLE PHOTONIC LINK AND INTERFACE MODULE

RELATED APPLICATION INFORMATION

This application is a United States National Phase of International Patent Application No. PCT/AU2008/001627 which was filed on Oct. 31, 2008, and claims priority to Australian Patent Application No. 2007905971, filed on Oct. 31, 2007, the disclosures of each of which are incorporated herein by reference.

FIELD OF THE INVENTION

This invention relates to a deployable photonic link, in particular but not exclusively to a deployable radio frequency (RF) photonic link suitable for use in harsh environmental conditions.

BACKGROUND OF THE INVENTION

A photonic link for use in conveying analogue RF signals requires the use of a single mode fiber optic cable to allow a signal transmitted at one end of the link to be received without distortion at the other end of the link. Photonic links also require a high optical return loss mandating the use of angle polished connectors. However, these connectors are fragile, easily contaminated and difficult to clean even in relatively benign environments making them unsuitable for repeated connection and disconnection in deployable applications. Connector contamination quickly leads to optical signal degradation and reduced performance of the link.

SUMMARY OF THE INVENTION

The invention in a first aspect may be said to reside in a deployable photonic link, including:
 a length of optical fiber; and
 an interface module fusion spliced to one end of the optical fiber so that the module is directly connected to the fiber;
 wherein the interface module includes at least one of: an input for receiving a first electrical signal including a first radio frequency signal component; and an output for outputting a second radio frequency signal component, and
 wherein the interface module further includes, respectively, at least one of: a device for receiving the first electrical signal from the input and for producing an optical signal modulated with the first radio frequency signal component for transmission in the optical fiber; and a device for receiving a modulated optical signal and for producing therefrom the second radio frequency signal component for output at the output.

Thus, according to this first aspect of the invention the module is connected directly to and integrated with the fiber by fusion splicing. The deployable link is robust and portable and can be moved from place to place for use in a variety of applications. Fusion splicing optical interfacing components in the interface module to the optical fibers themselves, the need for optical connectors is avoided, thereby avoiding problems of contamination of optical connectors which can lead to degradation of the optical signals and so performance of the link. Furthermore, the components of the interface module can be sealed to further prevent any contamination or degradation of the optical interface componentry.

The number of connectors required on the interface module for supplying power and for communicating radio frequency signals can also be reduced. To this end, in an exemplary embodiment of the present invention, the first electrical signal includes a first DC signal component in combination with the first radio frequency signal component and the device for receiving the first electrical signal includes:
 a first separator for separating the first DC signal component and the first radio frequency signal component of the first electrical signal;
 a fiber optic transmitter for receiving the first radio frequency signal component from the first separator and for generating an optical signal modulated with the first radio frequency signal for output to the optical fiber; and
 a first power supply for deriving power from the first DC signal component for supply to the fiber optic transmitter.

In a further exemplary embodiment, the output is arranged to receive a second DC signal component and the device for receiving the modulated optical signal includes:
 a fiber optic receiver for receiving the modulated optical signal and for producing the second radio frequency signal component;
 a second separator for separating the second DC signal component, received from the output, and the second radio frequency signal component, received from the fiber optic receiver, and for supplying the second radio frequency signal component to the output; and
 a second power supply for deriving power from the second DC signal component, received from the second separator, for supply to the fiber optic receiver.

In a further exemplary embodiment, the interface module includes both the input and the output and both the device for receiving the first electrical signal from the input and the device for receiving the modulated optical signal.

In a further exemplary embodiment, the link includes a first said interface module fusion spliced to said one end of the optical fiber, and a second said interface module fusion spliced to the fiber at the other end of the optical fiber.

In a further exemplary embodiment, the optical fiber is provided in a cable and the cable is provided on a rotatable reel, the first said interface module being inseparably mounted on the reel and the second said interface module being releasably attached to the reel so that, when released, the second said interface module may be deployed remotely from the first said interface module, linked thereto by a length of interlinking cable unwound from the reel.

The present invention, in a second aspect, may be said to reside in an interface module for a photonic link, including:
 an input for receiving an electrical signal including a DC signal component and a radio frequency signal component;
 a separator for separating a DC signal component and a radio frequency signal component of the electrical signal;
 a fiber optic transmitter for receiving the radio frequency signal component from the separator and for using the radio frequency signal component to modulate an optical signal produced by the transmitter; and
 a power supply for deriving power from the DC signal component for powering the fiber optic transmitter.

In an exemplary embodiment according to this second aspect, the power supply includes:
 a positive voltage regulator for receiving a positive DC signal component and for providing a regulated positive DC voltage to the fiber optic transmitter;
 a DC inverter for inverting the positive DC signal component to provide a negative DC voltage; and
 a negative DC voltage regulator for receiving the negative DC voltage and for supplying the regulated negative DC voltage to the fiber optic transmitter.

In a further exemplary embodiment, the interface module further includes a status monitor for monitoring the fiber optic transmitter and for providing an indication that a light signal is present.

In a further exemplary embodiment, the fiber optic transmitter includes a laser for launching light into the optical fiber, and a modulating arrangement for modulating the light produced by the laser with the radio frequency signal component.

In a further exemplary embodiment, an attenuator is provided for attenuating the radio frequency signal supplied to the fiber optic transmitter.

In a further exemplary embodiment, a controller is provided for controlling the supply of power from the power supply to the fiber optic transmitter.

The invention may also be said to reside, in a third aspect, in an interface module for a photonic link for receiving a modulated optical signal from an optical fiber and for outputting an electrical signal, including:

a fiber optic receiver for receiving the modulated optical signal and for producing a radio frequency signal component therefrom;

an output for outputting the radio frequency signal component and for receiving a DC signal component;

a separator for separating the DC signal component received from the output and the radio frequency signal component received from the fiber optic receiver and for supplying the radio frequency signal component to the output; and a power supply for deriving power from the DC signal component, received from the separator, for powering the fiber optic receiver.

In an exemplary embodiment according to this third aspect, the power supply includes a regulator for regulating the DC signal component for powering the fiber optic receiver.

In a further exemplary embodiment, the interface module further includes a status monitor for monitoring receipt of an optical signal at the fiber optic receiver and for providing an indication relating to the power of the received optical signal.

BRIEF DESCRIPTION OF THE DRAWINGS

FIG. 4a is a side view of a deployable photonic link implemented as a fiber optic cable reel according to an exemplary embodiment of the present invention.

FIG. 4b is a front view of the reel of FIG. 4a.

FIG. 5 is a plan view of the inside of the fiber interface module of FIG. 1 as used in the cable reel implementation of the present invention shown in FIG. 4a and FIG. 4b, shown with the lid removed.

DETAILED DESCRIPTION

Exemplary embodiments of the present invention will now be described in more detail, by way of example only, with reference to the accompanying drawings.

A deployable photonic link will now be described according to an exemplary embodiment of the present invention. The description will begin with details of an exemplary fiber interface module that forms the interface between a source and a receiver of RF signals to be conveyed over the photonic link. The photonic link includes a substantially identical fiber interface module provided at each end of a deployable length of fiber optic cable. That exemplary fiber interface module will be described initially with reference to FIG. 1.

Figure 1:
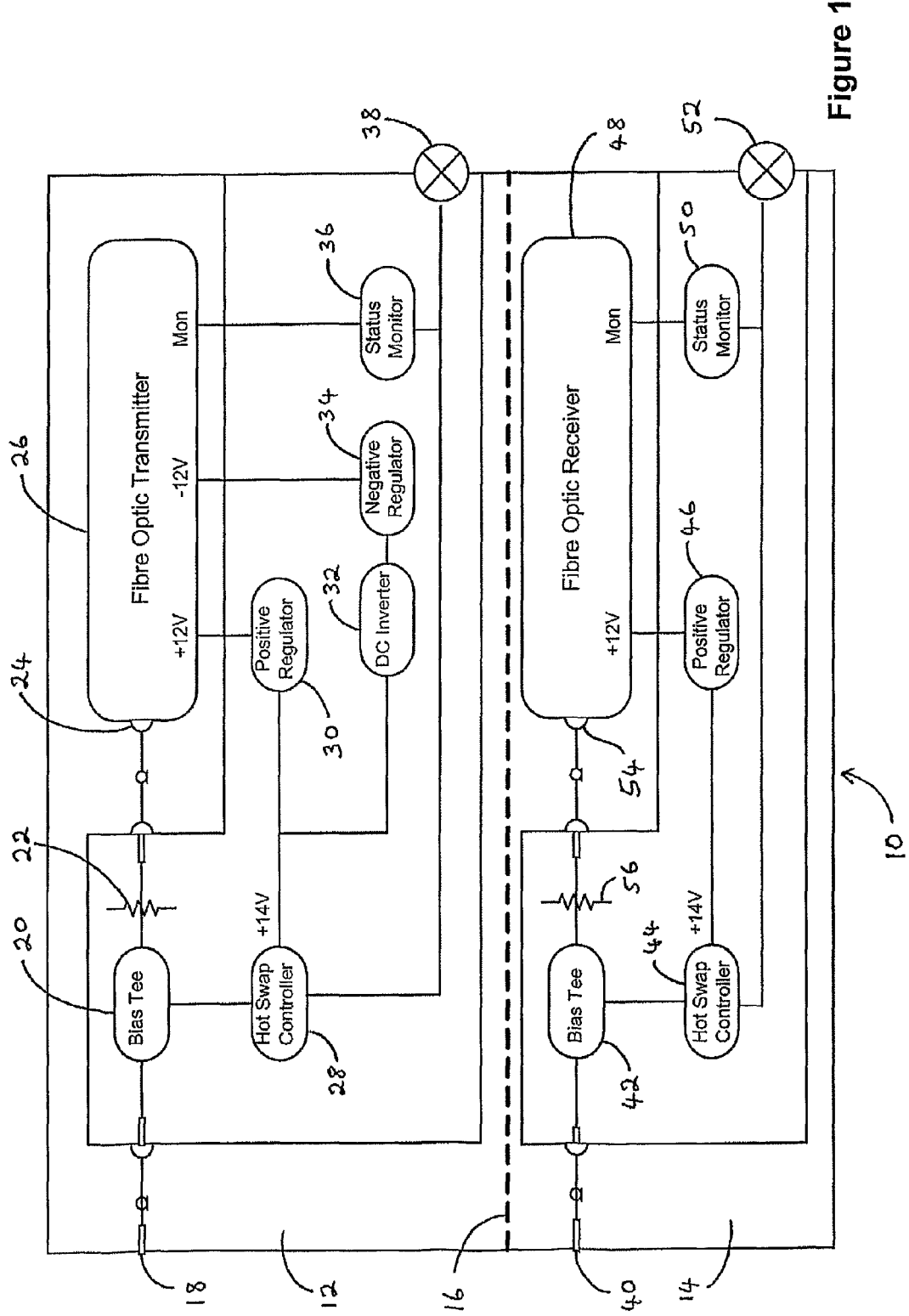
FIG. 1 is a block diagram of a fiber interface module according to one exemplary embodiment of the present invention.

Referring to FIG. 1, a fiber interface module 10 is shown divided internally into two parts: a first part 12 containing components to carry out transmitting functions; and a second part 14 containing components to carry out receiving functions. The fiber interface module 10 may include a main body in the form of a machined aluminium alloy enclosure having two separate chambers, represented by the first and second parts 12, 14 in FIG. 1, divided by a wall represented by a dividing line 16 in FIG. 1. Housing the transmitting and receiving components in separate chambers improves the isolation between transmitted and received signals.

An input 18, possibly in the form of a sealed snap-on "QN" coaxial connector, is provided to receive an electrical signal from attached equipment, including a positive DC signal component and an RF signal component, both of which travel through a central conductor of the coaxial connector. The electrical signal is supplied to a separator in the form of a bias tee 20 for separating the RF signal component from the DC signal component of the received electrical signal. The RF signal component is conveyed via an optional RF attenuator 22 to an input 24 of a fiber optic transmitter 26. The attenuator 22 also provides temperature compensation and broadband matching for the RF signal.

The positive DC signal component, which is used to supply power to those components used in the transmitting functions of the module 10, is supplied from the bias tee 20 to a "hot swap" controller 28 which filters the DC signal and ensures controlled powering-up of the fiber optic transmitter 26 in a smooth manner. The controller 28 supplies the DC signal to a positive DC regulator 30 which in turn supplies a positive DC signal to the fiber optic transmitter 26. The controller 28 also supplies the DC signal to a DC inverter 32 which inverts the positive DC signal to a negative DC signal and supplies the negative DC signal to a negative DC regulator 34. The regulated negative DC signal is also supplied to the fiber optic transmitter 26 to complete the power supply to the transmitter 26.

The fiber optic transmitter 26 has a light source and in particular a laser whose light may be modulated by the RF signal component supplied to the input 24 so as to produce a modulated optical signal which may be launched into an optical fiber of a fiber optic cable (not shown in FIG. 1).

The fiber optic transmitter 26 is also connected to a status monitor 36 which monitors the status of the transmitter 26 to determine whether DC power is being supplied and whether the transmitter 26 is operating without fault. If both conditions are satisfied, the status monitor 36 causes an associated transmitter status light emitting diode (LED) 38 to glow green. If there is a laser fault in the transmitter 26, for example, the status monitor 36 will cause the LED 38 to glow red.

The receiving functions of the fiber interface module 10 are housed in the second part 14 of the module 10. An output 40 from the module 10 is provided by an output coaxial connector, similar to the connector provided at the input 18, through which an electrical signal may pass including an incoming positive DC signal component, incoming to the connector (40) from attached equipment, and an outgoing RF signal component being output from the receiving components of the module 10, now to be described.

In a similar manner to that for the transmitting components described above, a bias tee 42 is linked to the output coaxial connector (40) to decouple an incoming DC signal component from an outgoing RF signal component and to pass the positive DC signal component via a "hot swap" controller 44 and a positive DC regulator 46 to provide power, in particular to a fiber optic receiver 48. A status monitor 50 is linked to the fiber optic receiver 48 to determine whether the fiber optic receiver 48 is receiving DC power and whether it is operating without fault. The status monitor 50 causes an associated receiver status LED 52 to glow green if DC power is being supplied and there are no receiver faults or to glow red if there is DC power but there is insufficient optical power being received from the above-mentioned fiber optic cable (not shown in FIG. 1).

Modulated light signals incoming to the fiber optic receiver 48 are detected and converted by the receiver 48 into an RF signal component for output (54), through an optional attenuator 56 and the bias tee 42, to the output 40 from the module 10. As mentioned above, the bias tee 42 decouples the outgoing RF signal component from an incoming DC signal component.

A photonic link according to an exemplary embodiment of the present invention, based upon a pair of the fiber interface modules 10 described above, will now be described with reference to FIG. 2.

Figure 2:
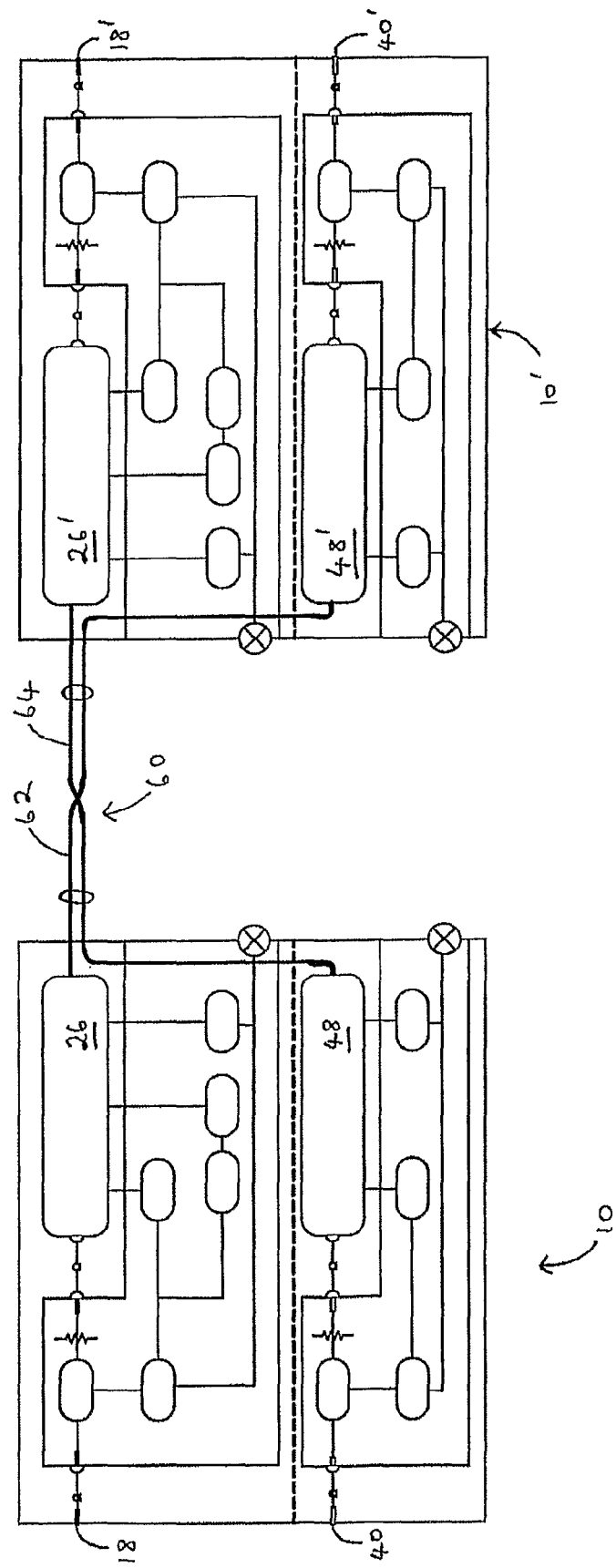
FIG. 2 is a diagram showing a photonic link including two fiber interface modules of the type shown in FIG. 1.

Referring to FIG. 2, a first fiber interface module 10 is shown linked to a second fiber interface module 10' by a deployable length of fiber optic cable 60, possibly of the order of 100 m in length. The fiber optic cable 60 may contain at least two optical fibers 62, 64: a first of those optical fibers, 62, links the fiber optic transmitter 26 of the first module 10 to the fiber optic receiver 48' of the second module 10'; and a second of those optical fibers, 64, links the fiber optic transmitter 26' of the second module 10' to the fiber optic receiver 48 of the first module 10.

In order to avoid any possibility of contamination in the optical pathways between the transmitters 26, 26' and the receivers 48, 48', optical connectors are avoided by fusion splicing the optical fibers 62, 64 of the cable 60 to optical fiber portions emerging from the transmitters 26, 26' and the receivers 48, 48'. The fiber interface modules 10, 10' are therefore inseparably connected to each end of the fiber optic cable 60. The fusion spliced connections may be made between portions of optical fiber that may remain within the housings of the fiber interface modules 10, 10' so that the jointed portions of the optical fibers remain free of the strains likely to be imposed on the cable 60 outside the housings, during repeated deployment. The fiber optic cable 60 enters through a hole in the housing of each fiber interface module 10, 10' by a heat-shrink boot which provides a fully dustproof and waterproof seal and an effective strain relief for the cable 60.

In a typical application of the photonic link described above with reference to FIG. 2, analogue RF signals may be communicated between a satellite communications antenna and associated transmitting/receiving equipment in a rapidly deployable field communications facility. In such an application, the most convenient or necessary position for placement of an antenna assembly may be some distance from the desired location of the transmitting/receiving equipment. A deployable photonic link according to the present invention provides a convenient way to interlink the antenna assembly with the transmitting/receiving equipment. The antenna assembly is connected to the input 18 and/or the output 40 of a fiber interface module 10 at one end of the photonic link and the fiber optic cable 60 is deployed so that the transmitting/receiving equipment may be connected to a fiber interface module 10' at the other end of the link by its output 40' and/or its input 18'. RF signals received at the antenna are input to the fiber interface module 10 where they are used to modulate an optical carrier signal which is carried over the optical fiber 62, detected in the fiber interface module 10' and output as corresponding RF signals to the transmitting/receiving equipment. An equivalent process operates in the reverse direction, although it will be clear that a unidirectional photonic link may be provided alternatively in which RF signals may be transferred in only one direction.

The fiber optic transmitter 26 and the fiber optic receiver 48 of a fiber interface module 10 will now be described in more detail with reference to FIG. 3 and additionally with reference to FIG. 1 and FIG. 2. Those features already shown in FIG. 1 or FIG. 2 carry the same reference numerals in FIG. 3 as used in those earlier figures.

Figure 3:
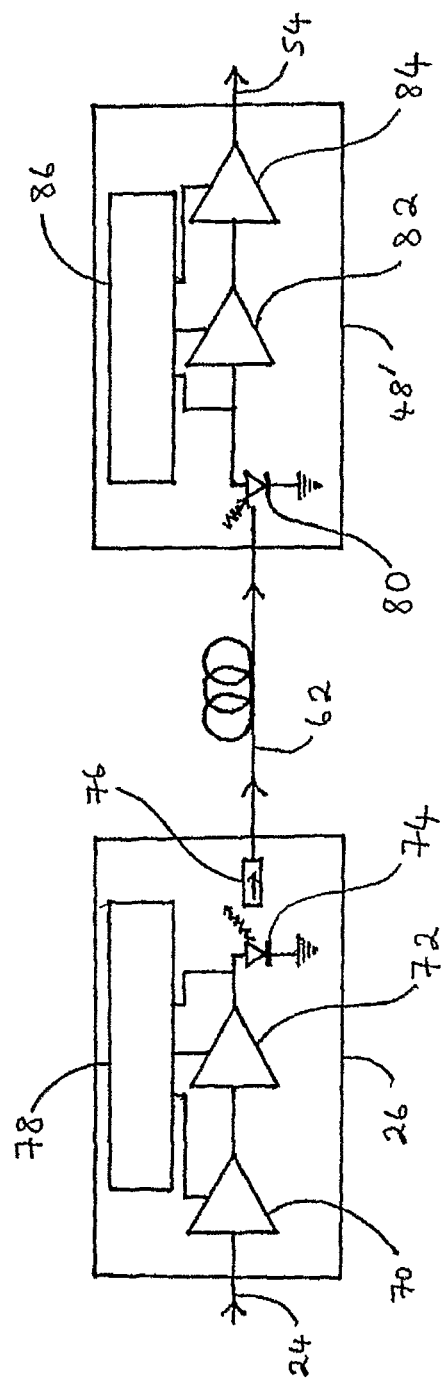
FIG. 3 is a more detailed diagram of the Fiber Optic Transmitter interconnected with the Fiber Optic Receiver of fiber interface modules of FIG. 1.

Referring in particular to FIG. 3, a fiber optic transmitter 26 is shown linked by an optical fiber 62 to a fiber optic receiver 48'. The transmitter 26 receives RF signals at an input 24, from the bias tee 20 of FIG. 1, and the RF signals are supplied to a low noise preamplifier 70 which provides some gain to reduce noise. The output of the preamplifier 70 is supplied to a transimpedance amplifier 72 which outputs a current corresponding to the RF signal to modulate a laser 74. The laser 74 produces a modulated optical signal which is supplied via an isolator 76 to the optical fiber 62. A laser bias loop and voltage regulator 78 supplies bias voltages to the amplifiers 70 and 72 and also to the laser 74. The isolator 76 minimizes the reflection of light back into the laser 74.

The laser bias loop and voltage regulator 78 is arranged to receive positive and negative DC power from the positive and negative regulators 30 and 34 respectively of FIG. 1, not shown in FIG. 3, and is arranged to output a signal to the status monitor 36 of FIG. 1 to indicate the presence of DC power and that the transmitter 26 is operating satisfactorily.

The fiber optic receiver 48', is provided with a photodiode 80 which detects the RF signals in a modulated optical signal received over the optical fiber 62 and outputs an RF electrical signal to a transimpedance amplifier 82. The transimpedance amplifier 82 outputs an RF signal to a preamplifier 84 which provides some gain and the amplified RF signal is output from the receiver 48' at an output 54. A photodiode bias and voltage regulator 86 is arranged to receive DC power from the positive regulator 46 of FIG. 1 so as to supply DC power to the amplifiers 82, 84 and to control biasing of the photodiode 80. The photodiode bias and voltage regulator 86 is also arranged to supply status signals to the status monitor 50 of FIG. 1 to indicate the presence of DC power and to indicate the power level of optical signals received over the optical fiber 62.

A similar arrangement to that shown in FIG. 3 is included in the bi-directional photonic link of FIG. 2 in which a further fiber optic transmitter 26' is arranged to communicate modulated optical signals over an optical fiber 64 to a fiber optic receiver 48. The optical fibers emerging from each of the fiber optic transmitters 26, 26' and receivers 48, 48' are fusion spliced to respective ends of the optical fibers 62, 64 in the fiber optic cable 60, as discussed above.

An exemplary implementation of the photonic link described above with reference to FIG. 2, in particular, will now be described with reference to FIGS. 4 and 5. Those features common to the earlier FIGS. 1 to 3 are shown with the same reference numerals.

Referring initially to FIG. 4, two views are provided of a photonic link according to an exemplary embodiment of the present invention implemented using a portable cable reel and stand. FIG. 4a is a side view of the cable reel and stand and FIG. 4b is an end-view of the same cable reel and stand. A cable reel 90, able to hold approximately 100 m of fiber optic cable 60 is mounted on a stand 92 such that the reel 90 may rotate and allow the cable 60 to unwind and so be deployed by pulling on a free end of the cable in a conventional manner.

A first fiber interface module 10 is connected to one end of the cable 60 in the manner described above and is inseparably mounted on the side of the cable reel 90 so that the module 10 may rotate with the cable reel 90 while the remainder of the cable 60 is deployed or retracted. That end of the cable 60 that is connected to the module 10 forms the lowest radius turn on the cable reel 90 so that in general that end will remain wound on the reel. A second fiber interface module 10' is connected to the other end of the cable 60. When in a storage configuration, as shown in FIG. 4a, the second fiber interface module 10' is shown attached to the stand by a strap 94 and releasable clasp 96.

To deploy the photonic link, the stand 92 is firstly placed at a desired location for one end of the photonic link, then the clasp 96 is released so as to free the strap 94 from the stand 92 so enabling the second fiber interface module 10' to be removed clear of the reel 90 and the stand 92. The second fiber interface module 10' may then be carried to a desired location for the other end of the photonic link, towing the cable 60 which thereby causes the reel 90 to rotate and the cable 60 to unwind from the reel 90. A heat-shrink boot 98, 98' provides not only an environmental seal where the cable 60 emerges from the fiber interface modules 10, 10', but also enables a certain amount of tension to be placed on the cable 60 during towing without putting strain on the fusion-spliced sections of optical fiber within the module 10, 10' itself.

When deployed, the coaxial connectors 18, 40 of the first fiber interface module 10 may be connected as required to equipment at that end of the link and the coaxial connectors 18', 40' of the second module 10' may connected as required to equipment at the other end of the link. Operation of the link may then begin.

A view of the interior of the fiber interface module 10, 10' will now be described with reference to FIG. 5.

Referring to FIG. 5, the interior of the fiber interface module 10 is shown with its lid removed so that the fiber optic transmitter 26 and fiber optic receiver 48 can be seen located in separate chambers 12 and 14 respectively. As discussed above, the use of separate chambers 12, 14 increases the isolation between transmitter 26 and receiver 48. The optical fibers 62 and 64 are shown where they emerge from the cable 60 into the fiber interface module 10. The optical fibers 62, 64 are fusion-spliced, where convenient within the chambers 12, 14, to lead-out fibers emerging from the transmitter 26 and the receiver 48 respectively.

In the storage position shown in FIG. 4, the reel 90 and stand 92, having the modules 10, 10' attached, provides a portable deployable photonic link which can be transported from place to place and used as an RF analogue communications link in a variety of applications.

The operating frequency of the photonic link may be in the range from 10 MHz up to 18 GHz.

In other exemplary embodiments of the present invention, the optical fibers 62 and 64 may be replaced with a single optical fiber if wavelength division multiplexing techniques and associated components are employed to enable bi-directional communications over the signal fiber. Furthermore, monitor and control data may be sent over the photonic link to monitor and control remote communications equipment, for example, using either single mode or multi-mode fibers. For example, equipment may be included in the fiber interface modules 10, 10' to enable a digital monitoring channel and a digital control data channel to be established using two spare optical fibers in the fiber optic cable 60. Alternatively, digital monitoring or control data may be encoded using frequency-shift keying (FSK) modulation and communicated along with other RF signals over the optical fibers 62, 64 as described above, interleaved using for example a time division multiplexing arrangement. Conveniently, some known satellite communications modems already provide for an FSK data channel to control remote equipment.

In an exemplary embodiment, a standard RJ45 network port connection and a fiber to Ethernet converter may be installed within the fiber interface module 10, 10' at each end of the photonic link. The fiber to Ethernet converter has an optical fiber output which may be fusion spliced to spare fibers in the cable 60 so that one or more digital data channels may be established over the photonic link for monitoring and control of remote equipment. Power for the converters may be derived from the DC signals available from one of the bias tees 20, 42 in each fiber interface module 10, 10'.

Both of the fiber interface modules 10, 10' as described above are arranged to modulate an optical signal thereby forming a two-way photonic link so that RF signals may be communicated in either direction. The interface modules 10, 10' may be completely enclosed and because they do not include any optical connectors, the advantages of the photonic link—lightweight, flat frequency response and electro-magnetically benign—are still attained whilst removing the issue associated with contamination of optical connectors and consequential performance degradation.

Since modifications within the spirit and scope of the invention may readily be effected by persons skilled within the art, it is to be understood that this invention is not limited to the particular embodiments described by way of example hereinabove.

The invention claimed is:

1. An interface module for a portable photonic link, comprising:
    an input for receiving an electrical signal including a DC signal component and a radio frequency signal component;
    a decoupler for decoupling the DC signal component and the radio frequency signal component of the electrical signal;
    a fiber optic transmitter for receiving the radio frequency signal component from the decoupler and for using the radio frequency signal component to modulate an optical signal produced by the transmitter; and
    a power supply for deriving power from the DC signal component for powering the fiber optic transmitter.

2. The interface module according to claim 1, wherein the power supply includes:
    a positive voltage regulator for receiving a positive DC signal component and for providing a regulated positive DC voltage to the fiber optic transmitter;
    a DC inverter for inverting the positive DC signal component to provide a negative DC voltage; and
    a negative DC voltage regulator for receiving the negative DC voltage and for supplying the regulated negative DC voltage to the fiber optic transmitter.

3. The interface module according to claim 1, further comprising:
    a status monitor for monitoring the fiber optic transmitter and for providing an indication that a light signal is present.

4. The interface module according to claim 1, wherein the fiber optic transmitter includes a laser for launching light into the optical fiber and a modulating arrangement for modulating the light produced by the laser with the radio frequency signal component.

5. The interface module according to claim 1, further comprising:
an attenuator for attenuating the radio frequency signal supplied to the fiber optic transmitter.

6. The interface module according to claim 1, further comprising:
a controller for controlling the supply of power from the power supply to the fiber optic transmitter.

7. An interface module for a portable photonic link for receiving a modulated optical signal from an optical fiber and for outputting an electrical signal, comprising:
a fiber optic receiver for receiving the modulated optical signal and for producing a radio frequency signal component therefrom;
an electrical output for outputting the radio frequency signal component and for receiving a DC signal component;
a decoupler for receiving the second radio frequency signal component from the fiber optic receiver, for supplying the second radio frequency signal component to the electrical output combined with the DC signal component received from the electrical output to form a second electrical signal and decoupling the second DC signal component from the second electrical signal; and
a power supply for deriving power from the DC signal component, received from the decoupler, for powering the fiber optic receiver.

8. The interface module according to claim 7, wherein the power supply includes a regulator for regulating the DC signal component for powering the fiber optic receiver.

9. The interface module according to claim 8, further comprising:
a status monitor for monitoring receipt of an optical signal at the fiber optic receiver and for providing an indication relating to the power of the received optical signal.

10. A portable photonic link, comprising:
a length of optical fiber; and
a first interface module fusion spliced to one end of the optical fiber and a second interface module fusion spliced to the other end of the optical fiber so that the first and the second interface modules are directly connected to the optical fiber;
wherein the first interface module includes:
an electrical input for receiving a first electrical signal including a first radio frequency signal component combined with a first DC signal component,
a first decoupler for electrically decoupling the first DC signal component and the first radio frequency signal component of the first electrical signal,
a fiber optic transmitter for receiving the decoupled first radio frequency signal component from the first decoupler and for producing therefrom an optical signal modulated with the first radio frequency signal component for transmission in the optical fiber, and
a first power supply for deriving power from the decoupled first DC signal component for supply to the fiber optic transmitter; and
wherein the second interface module includes:
a fiber optic receiver for receiving a modulated optical signal from the optical fiber and for generating therefrom a second radio frequency signal component;
an electrical output configured to receiver a second DC signal component and, in combination, to output the generated second radio frequency signal component;
a second decoupler for receiving the second radio frequency signal component from the fiber optic receiver for supplying the second radio frequency signal component to the electrical output combined with the second DC signal component being received at the electrical output to form a second electrical signal and decoupling the second DC signal component from the second electrical signal; and
a second power supply for deriving power from the decoupled second DC signal component, received from the second decoupler, for supply to the fiber optic receiver.

11. The portable photonic link according to claim 10, configured as a bi-directional photonic link, wherein the first interface module includes, integrated therewith and fusion spliced to the one end of optical fiber or to one end of a different optical fiber, a further second surface interface module, providing a further electrical output, and the second interface module includes, integrated therewith and fusion spliced to the other end of the optical fiber or to the other end of the different optical fiber, a further first interface module, providing a further electrical input.

12. The portable photonic link according to claim 10, wherein the optical fiber includes a cable carrying one or more optical fibers and the cable is provided on a rotatable reel, one of the first and second interface modules being inseparably mounted on the reel and the other of the first and second interface modules being releasably attached to the reel so that, when released, the other of the first and second interface modules may be deployed remotely from the reel, linked thereto by a portion of said cable unwound from the reel.

13. The portable photonic link according to claim 10, wherein the first decoupler and the second decoupler include bias-tee devices.

14. The portable photonic link according to claim 11, wherein the electrical input, the further electrical input, the electrical output and the further electrical output are provided using different physical connectors.

* * * * *